United States Patent [19]
Kuhnle et al.

[11] 3,796,274

[45] Mar. 12, 1974

[54] SCALE, AND METHOD OF ZERO-SETTING THE SAME

[75] Inventors: Ernst Kuhnle; Josef Schwarz, both of Balingen, Germany

[73] Assignee: Bizerba-Werke Wilhelm Kraut KG, Balingen, Germany

[22] Filed: July 24, 1973

[21] Appl. No.: 382,203

[30] Foreign Application Priority Data
July 26, 1972 Germany............................ 2236546

[52] U.S. Cl...................................... 177/1, 177/169
[51] Int. Cl.............................................. G01g 23/14
[58] Field of Search....... 177/1, 164, 171, 176, 191, 177/194, DIG. 2, DIG. 3, 168, 169, 170

[56] References Cited
UNITED STATES PATENTS
3,193,030    7/1965    Meier............................ 177/168 X Primary Examiner—George H. Miller, Jr.
Attorney, Agent, or Firm—Michael S. Striker

[57] ABSTRACT

A scale having digital weight indication is weighted with a weight whose magnitude is exactly half that of the smallest weight increment that can be indicated by the scale, and thereafter the scale is tared until the weight indication provided by the scale is indifferent between two consecutive ones of the smallest weight increments.

9 Claims, 2 Drawing Figures

3,796,274

SCALE, AND METHOD OF ZERO-SETTING THE SAME

BACKGROUND OF THE INVENTION

The present invention relates generally to scales having digital weight indication, and more particularly to a method of zero-setting such scales and to an improved construction in such a scale which permits such zero setting.

As is well known, all scales must from time to time be adjusted for zero-setting, that is they must be brought to an exactly balanced position. This is done by means of highly sensitive taring equipment and can be done reasonably readily if the scale is of the type having a linear dial-type indicator. With this type of scale, each weight increment is indicated by the spacing between two indicator lines on the dial, and using the taring equipment the scale can be exactly zero-set (that is adjusted to precise balance) up to the thickness of the respective indicating lines. This corresponds to approximately one-fourth to one-fifth of the smallest indicatable weight, that is the weight which can be indicated intermediate two successive ones of the lines. In other words, if the weight that is measured as the indicator moves from one to the successive line of the dial amounts for instance to 1 gm, then the accuracy with which the scale can be adjusted during zero-setting amounts to approximately 0.2 gms.

Unfortunately, this type of adjustment cannot nearly as readily be accomplished in the more and more popular scales having digital weight indication. Unlike the aforementioned type of scale, where the weight is shown continuously, for instance by movement of an indicator or pointer over the dial, the weight in digital scales is shown in steps, that is digitally, and the intermediate weight between two successive digital indications is not indicated. Assuming, for instance, that the smallest amount of weight that can be shown by two successive digital indications of the scale is again 1 gm, then the actual weight being determined by the scale can deviate from the weight being registered by the digital indicating device by ± 0.5 gm. It follows from this that the zero-setting position of the scale can deviate in a similar manner, that is when the digital indicating device indicates zero weight, the actual weight measurement of the scale may be higher than this value by 0.5 gm. or lower than this value by 0.5 gm. Given the same frame of reference, that is a minimum or smallest weighing unit of 1 gm. between two successive indications, for both the digital and the continuous-type of scale, it is clear that the continuous scales are substantially more accurate because the deviation there would be only approximately 0.2 gm. versus 0.5 gm. for the digital-type scale. Evidently, therefore, the accuracy in the zero-setting adjustment of digital scales is not sufficient and, in fact, in many instances the aforementioned degree of inaccuracy is actually prohibited by law.

SUMMARY OF THE INVENTION

It is, accordingly, an object of the present invention to overcome the disadvantages of the prior art.

More particularly, it is an object of the present invention to provide an improved method of zero--setting a scale having a digital weight indication.

Another object of the invention is to provide such a method which affords an accuracy of zero-setting which is at least equal to that of conventional continuous-indication scales.

An additional object of the invention is to provide an improved scale having an arrangement for such accurate zero-setting.

In keeping with the above objects, and with others which will become apparent hereafter, one feature of the invention resides in a method of zero-setting scales having digital weight indication. Briefly stated, the method comprises the steps of weighting a scale having digital weight indication with a weight whose magnitude is exactly half that of the smallest weight increment that can be indicated by the scale. Thereafter, the scale is balanced (i.e., tared) until the weight indication provided thereby is indifferent between two consecutive ones of the smallest weight increments.

The invention is based on the fact that each weight measurement indicated on a digital scale, that is a scale having digital weight indication, is subject to what we wish to call an uncertainty factor, corresponding in magnitude to half of the smallest weight indication that can be provided by the digital scale, that is half the step between one digital weight indication and the next successive indication. Assuming, for the sake of explanation, that the scale provides digital weight indication in steps of 1 gm. each, then this uncertainty factor is ±0.5 gm. Exactly midway between the two consecutive indications, at the so-called rounding point, digital weight indicators of scales exhibit what for purposes of the present description and of the claims appended hereto we have decided to call an indifferent behavior. This means that if the scale measures a weight located exactly between two successive digital steps or increments, the digital weight indicator tends to "jump" between the upper and lower indications. If, for instance, the weight is 1.5 gm., then the indicator will tend to jump between an indication of 1 gm. and an indication of 2 gm., that is it will exhibit an indifferent behavior. If the weight indicator is of the electronic type, wherein the weight is indicated by luminous numerals, this indifferent behavior will be manifested by flickering wherein alternately the numerals 1 and 2 will become illuminated, assuming the aforementioned example. Thus, the indifferent behavior of the scale can be quite readily identified. Moreover, it can be precisely brought about by appropriate weighting or removal of weight from the scale. We have found that the accuracy of the rounding point, for instance between the numerals 1 and 2, can be as precise as in a correspondingly divided continuous-type scale.

The present invention utilizes the aforementioned realization, obtaining a zero-setting of a digital scale by adding or removing a weight whose magnitude is equal to exactly half the weight indicated between two successive digital steps of the scale, that is the magnitude is exactly half to the smallest weight increment that can be indicated by the scale. Thus, if the smallest weight increment that can be indicated by the scale is 1 gm., then a weight of 0.5 gm. can be applied to the scale or removed therefrom, in accordance with the invention. After the weight has been applied to the scale the latter is tared, for instance by means of a taring spring or special taring weights, until the weight indication of the digital weight indicator of the scale jumps between a value corresponding to zero and a value corresponding to 1. This is an indication of indifferent behavior of the scale, that is it means that the rounding point between the values zero and 1 has been reached. If the weight is thereupon removed again, the scale will have been zero set exactly to the zero point.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
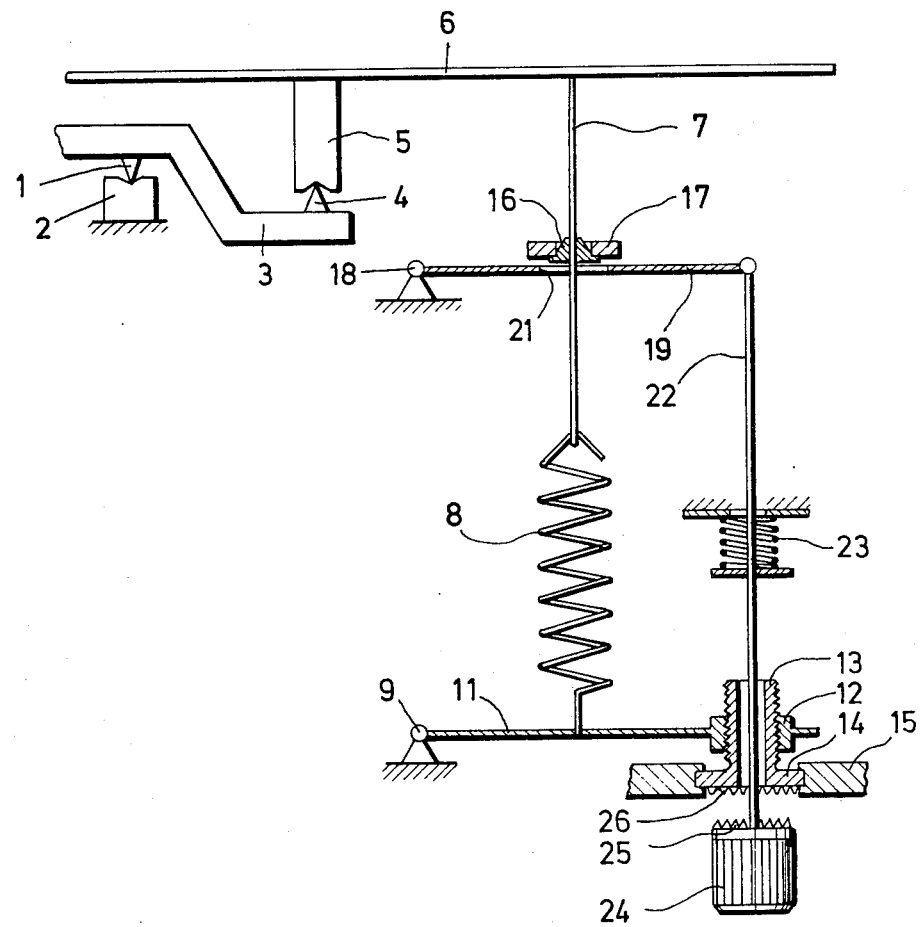
FIG. 1 is a fragmentary diagrammatic view illustrating, in a scale having digital weight indication, an arrangement for zero-setting according to the present invention.
Figure 2:
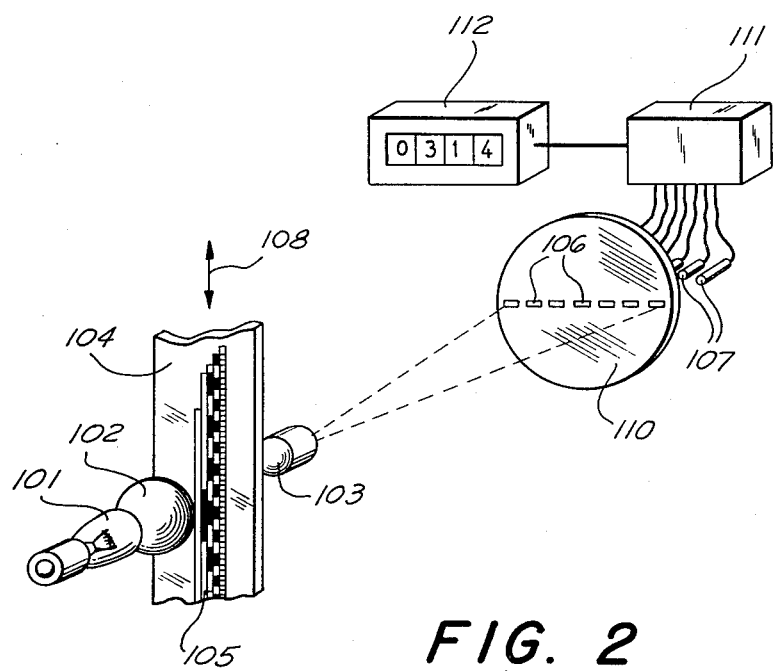
FIG. 2 is a diagrammatic view illustrating the digital weight indicating arrangement of the scale in FIG. 1.

Discussing the drawing in detail, it will be seen that the scale indicated somewhat diagrammatically and fragmentarily in FIGS. 1 and 2 is of the digital type, that is it provides an indication of the measured weight in formal digital steps. A weighing arm 3 has a knife edge 1 and is balanced on a seat 2. Only a portion of the arm 3 is illustrated, the remainder being well understood by those skilled in the art. A load-carrying platform 6 is in turn balanced on the arm 3 by means of the knife edge 4 and the seat 5. The weight to be measured will, of course, be placed onto the platform 6. A rod 7 is connected with the platform 6 and extends downwardly therefrom, having a lower end portion which is connected with one end of a helical spring 8, the other end of which is connected to a single-armed lever 11. The latter is journalled at one end by means of pivot 9, and has a free end which is connected with a nut 12. Threaded into the nut 12 is a hollow shaft 13 provided with an external thread. A flange 14 of the shaft 13 is mounted in a stationary support 15, so that the shaft 13 can be turned but is fixed against axial movement. This means that when the shaft 13 is turned, the nut 12 will move axially on it in one or the other axial direction, depending upon the direction in which the shaft 13 is turned, and will thus pivot the lever 11 upwardly or downwardly in FIG. 1. This will either result in a tensioning or a relaxation of the spring 8, so that the downward force exerted upon the platform 6 via the spring 8 and the rod 7 can be increased or decreased. This means that the spring 8 acts as a taring spring which is used to tare the scale.

An annular member 16 is provided on the rod 7 and acts as a shoulder. It could be a separate member secured to the rod 7, or it could be of one piece with the same. What is important is that the member 16 serves to support an annular weight 17 whose magnitude is exactly half that of the smallest weight which can be indicated by the digital indicating device of the scale, that is for instance the magnitude of the weight 17 will be 0.5 gm. if the smallest weight that can be indicated by the digital indicator of the scale is 1 gm.

An arm 19 is pivoted to a stationary part of the scale by means of the pivot 18; it is provided with a hole through which the rod 7 freely extends but which is small enough so that the weight 17 extends outwardly beyond the hole. Thus, when the arm 19 is pivoted upwardly about the pivot 18 in FIG. 1, the weight 17 will come to rest on the arm 19 whereas the member 16 can pass through the opening or hole 21, so that the weight 17 is lifted off the member 16, whereby the additional weight 17 is removed from the platform 6, that is it no longer acts upon the same. The free end of the arm 19 has pivoted to it a rod 22 which is urged to the position illustrated in FIG. 1 by a spring 23. In other words, the rod 22 normally assumes the illustrated position in FIG. 1 under the urging of the spring 23. A knob 24 is mounted on the free end of the rod 22 so as to be turnable but not axially displaceable relative to the rod 22. The end face of the knob 24 which faces towards the flange 14 of the shaft 13 is provided with projections 25, for instance an annulus of teeth. Corresponding projections 26 are provided on that side of the flange 14 which faces towards the knob 24 so that the projections 25 and 26 can engage if the rod 22 is moved upwardly, and act.

If the zero-setting of the scale is to be tested, and if it is to be corrected in the event it is found inaccurate, then the knob 24 is engaged and urged upwardly, thereby shifting the rod 22 in upward direction in FIG. 1. This causes the weight 17 to be lifted off the member 16 and thereby to be disengaged from the carrier 6. The upward movement of knob 24 and rod 22 is continued until the projections 25 and 26 become engaged, and now the knob 24 is turned so that the shaft 13 is rotated, permitting an adjustment in the tension of the taring spring 8. This is continued (with the weight 17 still removed from loading of the carrier 6) until the digital indicator jumps between the values zero and −1. The knob 24 is thereupon released, so that the arrangement is returned to the position in FIG. 1 under the urging of the spring 23 and the weight 17 again acts upon the platform 6. At this time the scale is exactly set to zero.

FIG. 2 shows a basically known digital indicating arrangement that can be employed in the scale of FIG. 1. Reference numeral 101 identifies a light source, reference numeral 102 a condenser and reference numeral 103 a lens system. These components cooperate to project a strip-shaped code 105 (for instance a Graycode) which is provided on a glass plate 104, in an enlarged manner onto a baffle 110 having a plurality of rectangular adjacent openings 106. The light which passes through the openings 106 impinges upon photoelectric receivers 107 located behind the baffle 110, for instance phototransistors, photoresistors or other photo elements. Each of the openings 106 is associated with one of the receivers 107 which, when light impinges upon them through the respectively associated opening 106, originate an electrical signal which is supplied in known manner to an amplifying and decoding circuit 111 with which a digital indicating means 112 is connected. The device 112 indicates the measured weight, for instance a weight of 1 gm., in digital manner, for instance by means of photodiodes or by means of mechanical number wheels.

The glass plate 104 with the code 105 is connected directly or indirectly—for instance by means of guides, levers or the like—with the weighing arm 3 of FIG. 1, and during weighing the blade 104 is displaced in the direction of the arrow 108 in dependence upon the magnitude of the weight which is placed upon the carrier 6. Correspondingly, the picture of the code 105 moves with reference to the openings 106 and originates a corresponding digital indication in the device 112.

It should be understood that the operation of the digital system which has been shown in FIG. 1 and just described above, is not novel per se, and that the present invention resides merely in the manner in which the scale can be brought to a zero-setting position and can be properly tared. However, if desired, reference may be had for a more detailed description of the operation of digital indicating devices in scales to German Pat. No. 1,274,808, with the understanding that the information contained therein is of a character known to those skilled in this art and is not essential to a proper understanding and appreciation of the present invention.

In the embodiment disclosed herein, we have illustrated that zero-setting is accomplished by removing the action of the weight 17 from the load carrier 6, so that taring must be between the values zero and −1 of the digital indicator of the scale. However, it is equally well possible to apply a weight 17 to the load carrier 6, rather than to remove it. In this case, the taring would have to be such that the scale is adjusted until an indifferent behavior is obtained between the values zero and +1. Moreover, zero-setting can be readily automated if desired, in that the shifting of the rod 22 and the turning of the knob 24 or of the flange 14 are carried by means of an appropriate motor or other drive.

In any of the embodiments mentioned above, it is, however, an important advantage of the present invention that the tension of the taring spring 8 can be changed only after the knob 24 and the rod 22 have been shifted until the weight 17 has been disengaged from the load carrier 6 (or, conversely, has been engaged therewith) and the knob 24 is coupled with the flange i4 of the shaft 13.

It will be understood that each of the elements described above, or two or more together, may also find a useful application in other types of constructions differing from the type described above.

While the invention has been illustrated and described as embodied in a scale having digital weight indication, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of zero--setting scales having digital weight indication, comprising the steps of weighting a scale with a weight whose magnitude is exactly half that of the smallest weight increment that can be indicated by the scale; and thereafter balancing the scale until the weight indication provided thereby is indifferent between two consecutive ones of the smallest weight increments.

2. In a scale, a combination comprising a weighing mechanism; digital indicating means for indicating weighing results of said mechanism in incremental digital steps, including smallest and larger steps; means for applying to said weighing mechanism a weight whose magnitude is exactly half that indicated by the respective smallest steps; and means for balancing the scale after application of said weight, until the weight indication provided by said digital-indicating means is indifferent between two consecutive ones of said smallest digital steps.

3. A combination as defined in claim 2, including preventing means for preventing operation of the balancing means prior to operation of the applying means.

4. A combination as defined in claim 2, wherein the balancing means comprises coupling portions for selectively coupling it to and uncoupling it from the applying means.

5. A combination as defined in claim 2; and further comprising motor means associated with the applying means and the balancing means for effecting automatic operation of the same.

6. A combination as defined in claim 2, wherein the applying means comprises a rod shiftable between at least two positions and operative for applying said weight to and removing it from said weighing mechanism, and a turnable knob mounted on said rod; and wherein the balancing means comprises a shaft which is engageable with said knob when said rod is in one of said positions.

7. A combination as defined in claim 6, said applying means further comprising a movable lever for applying and removing said weight, and said rod being connected with said lever for moving the same.

8. A combination as defined in claim 7; further comprising biasing means permanently urging said rod to the other of said positions.

9. A combination as defined in claim 7, wherein said balancing means comprises a balancing spring, an arm associated with said balancing spring for stressing the same, and a nut threaded onto said shaft and operative for moving said arm.

* * * * *